(12) United States Patent
Yu (10) Patent No.: US 11,593,803 B2
(45) Date of Patent: Feb. 28, 2023

(54) TWO LEVEL CRUX CHAIN PLATFORM FOR PROTECTING AND VERIFYING BLOCKCHAIN DATA

(71) Applicant: Fong Chuan Julian Yu, Singapore (SG)

(72) Inventor: Fong Chuan Julian Yu, Singapore (SG)

( * ) Notice: Subject to any disclaimer, the term of this patent is extended or adjusted under 35 U.S.C. 154(b) by 31 days.

(21) Appl. No.: 17/343,793

(22) Filed: Jun. 10, 2021

(65) Prior Publication Data
US 2022/0405751 A1   Dec. 22, 2022

(51) Int. Cl.
G06Q 20/40   (2012.01)
G06Q 30/08   (2012.01)
H04L 9/32    (2006.01)
H04L 9/00    (2022.01)

(52) U.S. Cl.
CPC .......... *G06Q 20/401* (2013.01); *G06Q 30/08* (2013.01); *H04L 9/3239* (2013.01); *G06Q 2220/00* (2013.01); *H04L 9/50* (2022.05); *H04L 2209/56* (2013.01)

(58) Field of Classification Search
CPC .. G06Q 2220/00; G06Q 20/4014; H04L 9/50; H04L 9/3239; H04L 2209/56
See application file for complete search history.

(56) References Cited

U.S. PATENT DOCUMENTS

| | | | | |
|---|---|---|---|---|
| 10,397,328 | B2* | 8/2019 | Bohli | H04L 67/1095 |
| 10,789,020 | B2* | 9/2020 | Karr | G06F 11/1076 |
| 11,431,561 | B2* | 8/2022 | Smith | H04L 41/12 |
| 2018/0019867 | A1* | 1/2018 | Davis | H04L 9/0637 |
| 2019/0140935 | A1* | 5/2019 | Kikinis | G06F 16/182 |
| 2019/0182313 | A1* | 6/2019 | Yoo | H04L 67/1097 |

FOREIGN PATENT DOCUMENTS

CA   3098939 A1 *  5/2020   ........... G06F 16/128

OTHER PUBLICATIONS

Zhang, PeiYun, An Optimization Model for Transaction Placement in Blockchain Shards, IFAC PapersOnLine, 2020, vol. 53 (5), p. 374-378.*

* cited by examiner

*Primary Examiner* — Ilse I Immanuel (57) ABSTRACT

The present invention relates to a two level crux chain platform with a Proof of History (PoH) for increasing security, robustness and/or verifiability of a blockchain includes a first initial block with a node assigned to an address of a shard, a plurality of following blocks comprising a new address for each of the following blocks generated using previous address and previous block head by a ladder swapping protocol, a record stream with a plurality of stream value and each stream value is a current record value hashed with a previous stream value and a blockchain server for storing a plurality of modules.

10 Claims, 11 Drawing Sheets

TWO LEVEL CRUX CHAIN PLATFORM FOR PROTECTING AND VERIFYING BLOCKCHAIN DATA

FIELD OF THE INVENTION

Embodiments of the present invention relate to the field of blockchain technology and more particularly to a Crux chain platform for providing a more secure and robust blockchain and for protecting and verifying blockchain data.

DESCRIPTION OF THE RELATED ART

In general, blockchain technology refers to a technology that records and stores contents of transactions performed over a network communication in a reliable and secure way. A blockchain network is a system in a distributed environment in which the exchange of digitized assets or transactions are enabled, and, using a shared ledger, it records the history of electronic transactions or operations that occur in a peer-to-peer (P2P) network. Since the blockchain network uses a decentralized consensus mechanism, forgery and alteration of transactions by third parties is practically impossible, and this ensures the reliability and transparency of transactions.

The blockchain network is a decentralized distributed data storage system involving multiple nodes. Once the data is written to the blockchain on each node, on the one hand, it means that the data is publicly available on the entire network. On the other hand, the data written on the blockchain is also difficult to delete and tamper with. Based on this, in the field of data storage, blockchain technology has great application prospects.

Thus, to overcome the drawbacks the present invention aims to provide a platform which allows non-disclosure of the sensitive data written into the blockchain without affecting the normal operation of the deposit certificate business for the other data. The Crux chain platform in the present invention is a blockchain of simple, lean, and flexible design, aiming to provide efficient and high performance blockchain services.

SUMMARY OF THE INVENTION

Embodiments of the present invention relates to a two level Crux chain platform for efficient and high performance blockchain and allowing cross-chain transactions for other blockchains for a distributed ledger. The two level Crux chain platform includes a first initial block with a node assigned to an address of a shard, and a first record value is a first stream value, a plurality of following blocks comprising a new address for each of the plurality of following blocks generated by a previous address and a previous block head by a ladder swapping protocol, a record stream with a plurality of stream value and each of the plurality of stream value is a current record value hashed with a previous stream value, and a blockchain server for storing a plurality of modules.

In accordance with an embodiment of the present invention, the blockchain server performs steps of assigning a node a unique address with a shard number in section 1 and the shard address in section 2 in the block, linking a block by hashing function of a block value via parallel proof of history (PoH) to form a main chain, transforming the shard address by a swapping matrix as the shard number and linking user records by hashing of record value by parallel proof of history (PoH) to form record chain loaded in address chain and checking loaded records by parallel proof of history (PoH). In particular, the swapping patrix includes a current shard number and current block value, for a current shard address transformation to generate a shard number in a next block.

In accordance with an embodiment of the present invention, the modules includes a parallel proof of history (PoH) module, a non-predictable and traceable address chain module, an adjustment verification module, a bidding and Mean/A preagreed percentile Value module, a mathematical module and a cryptographic module.

The parallel proof of history (PoH) module is configured to link a user transaction record to form parallel proof of history (PoH) Record Streams with an address chain.

The non-predictable and traceable address chain module is configured to generate a non-predictable and a traceable address by a current address in a block and a current block value by the ladder swapping.

The adjustment verification module is configured to view a transaction record of a requester module in the shard and verifies it by either shard level verification (SLV) or record level verification (RLV).

The bidding and mean/a preagreed percentile value module operably allows the shard level bidding winner to participate and compare a block level mean/a preagreed percentile value to decide a final winner who gets the price and its block as a formal version.

The mathematical module is operably configured to perform a hashing function to form the block. The hashing function is any of a secure hash algorithm, the ladder swapping, a modular addition or a modular multiplication.

The cryptographic module is configured to generate a crypto coin for rewarding the winner and collects revenue by charging a shard transaction fee. And, new coins may be generated as reward to winners in level two, or level one if necessary. In particular, shard transaction fee (STF) is the total collected fees minus total rebate amount. Moreover, once the number of nodes grows to a certain level and total transaction fees after rebates are substantial, a part of the shard transaction fee can be retained by the shard representative as a bonus.

In accordance with an embodiment of the present invention, the two level Crux chain platform further comprises a checking row for shard level verification, wherein the shard records in a current block is the checking row in the next block and a binary table operably configured with the mathematical module to validate hashing of the transaction value according to the digits of the address.

In accordance with an embodiment of the present invention, the shard level verification (SLV) includes providing by the requester module to provide a full set containing the record (record value and stream value) of the shard, then verified by a verifier module which checks if the shard value of requested set matches and a record in the provided full set matches the corresponding record in the checking row by applying a previous stream value with the record value. The shard level verification can also be conducted by the binary table of the shard by modular values of corresponding digits of the address.

In accordance with an embodiment of the present invention, the record level verification (RLV) includes providing by the requester module, the record (record value and stream value) with a full address of the record, checking by a verifier module, if the record is in the shard, or in the checking row, and checking with a previous stream value of the record or forwarding by a verifier module, a request to the node in a same shard and the checking row for verification by other verifier module who has this record in its shard or checking row.

In accordance with an embodiment of the present invention, a minimal requirement for a participating node at block level to generate a block value includes the previous block head and current shard values of all shards belonging to the current block.

In accordance with an embodiment of the present invention, the minimal requirement for participating nodes at a shard level include stream values and record values in the same shard.

In accordance with an embodiment of the present invention, the minimal data requirement for verification request includes stream values and record values of the shard where the requesting record belongs for shard level verification (SLV). And, the minimal data requirement for verification request includes record value and stream value, and the full address when the requesting record belongs to the record level verification (RLV).

In accordance with an embodiment of the present invention, the node has a unique address with a shard number in section 1 and the shard address in section 2 in the block.

In accordance with an embodiment of the present invention, the swapping matrix uses any of a forward swapping or a reverse swapping.

In accordance with an embodiment of the present invention, the address chain uses any of a forward process and/or a reverse process.

In accordance with one embodiment of the present invention, the forward process includes forming the swapping matrix with the current block and the shard number, creating the swapping matrix changing the shard address in section 2 of the block via swapping. In particular, the swapped shard number of the current address is the shard address in the next block.

In accordance with one embodiment of the present invention, the reverse process includes swapping the current shard address together with the previous block head to form the swapping matrix and generating a shard number by reverse mapping in a previous block. In particular, the current shard number is the previous shard address.

Another embodiment of the present invention relates to a method for transferring information in blocks for a distributed ledger in a two level Crux chain platform. The method includes steps of assigning a node a unique address with a shard number in section 1 and the shard address in section 2 in the block, linking a block by hashing function of a block value via parallel proof of history (PoH) to form a main chain, transforming the shard address by a swapping matrix as the shard number and linking user records by hashing of record value by parallel proof of history (PoH) to form record chain loaded in address chain and checking loaded records by parallel proof of history (PoH). In particular, the swapping matrix includes a current shard number and current block value, for a current shard address transformation to generate a shard number in a next block.

In accordance with one embodiment of the present invention, the method further comprises generating a full address in the next block for the address chain by increasing the current block number by one to be a next block number and wherein the shard number in the current block is the shard address in the next block, and generating the shard number in the next block by inputting the current shard address in the swapping matrix. The swapping matrix is composed of current block head and current shard number and the shard number and shard address have equal number of digits.

It is to be understood that both the foregoing general description and the following detailed description of the present invention are exemplary and explanatory and are intended to provide further explanation of the invention as claimed.

BRIEF DESCRIPTION OF THE DRAWINGS

So that the manner in which the above recited features of the present invention is understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The principles of the present invention and their advantages are best understood by referring to FIG. 1 to FIG. 11. In the following detailed description of illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described in connection with the embodiment is included in at least one embodiment of the present disclosure.

Figure 1:
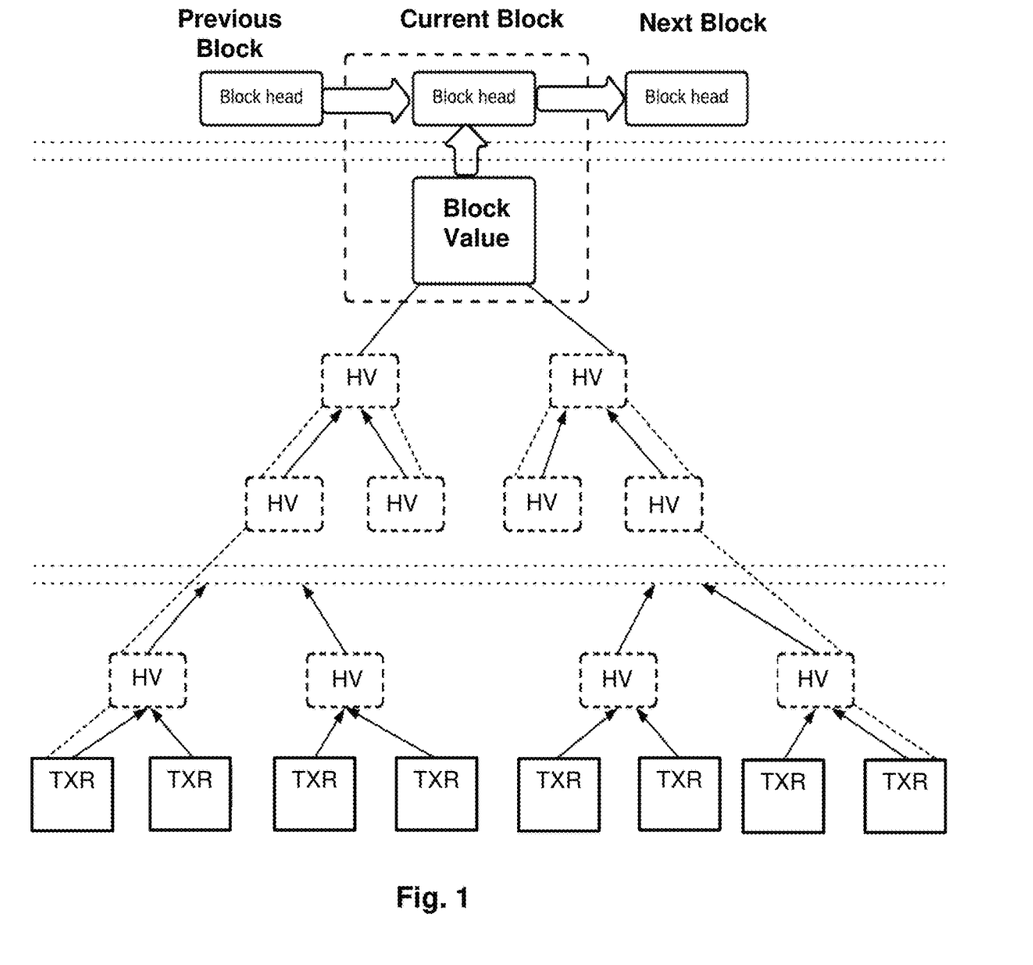
FIG. 1 is a pictorial representation illustrating a traditional structure overview of blockchain platform within which Crux chain has made improvements in various aspects of the present disclosure can be implemented, in accordance with one or more embodiments of the present invention.

FIG. 1 is a pictorial representation illustrating a traditional blockchain structure overview that a Crux chain platform has made improvements within which various aspects of the present disclosure can be implemented, in accordance with one or more embodiments of the present invention. In particular, the section of transaction records at the lower level is called Shard. A specific unique position as address (shard number+shard address) in a block (block number) under construction is assigned to each participating node in the Crux chain platform. The blocks are linked by hashing of block values via parallel proof of history (PoH) to form the main chain. Moreover, node's current address links to an address in the next block by shard number becoming shard address, and shard address transformed via swapping matrix as shard number. The swapping matrix is composed by current shard number and current block value, for current shard address transformation to generate shard number in the next block. Further, the swapping algorithm is by modified ladder swapping, to guarantee uniqueness and two-way traceable address for participating nodes in the traceable address chain.

In addition to the main chain, each participants' records are also linked by hashing of record value by parallel proof of history (PoH), to form a record chain loaded in the address chain. As the address chain is two-way traceable and the loaded records can be checked by parallel proof of history (PoH), it provides high security and is easy to verify.

Further, the parallel proof of history (PoH) on address chains scrutinize individual record chains of each participating node as part of inter block structure. Subsequently, scrutinize inter block structure.

In accordance with one embodiment of the present invention, the two level Crux chain platform may be extended to multiple levels.

Figure 2:
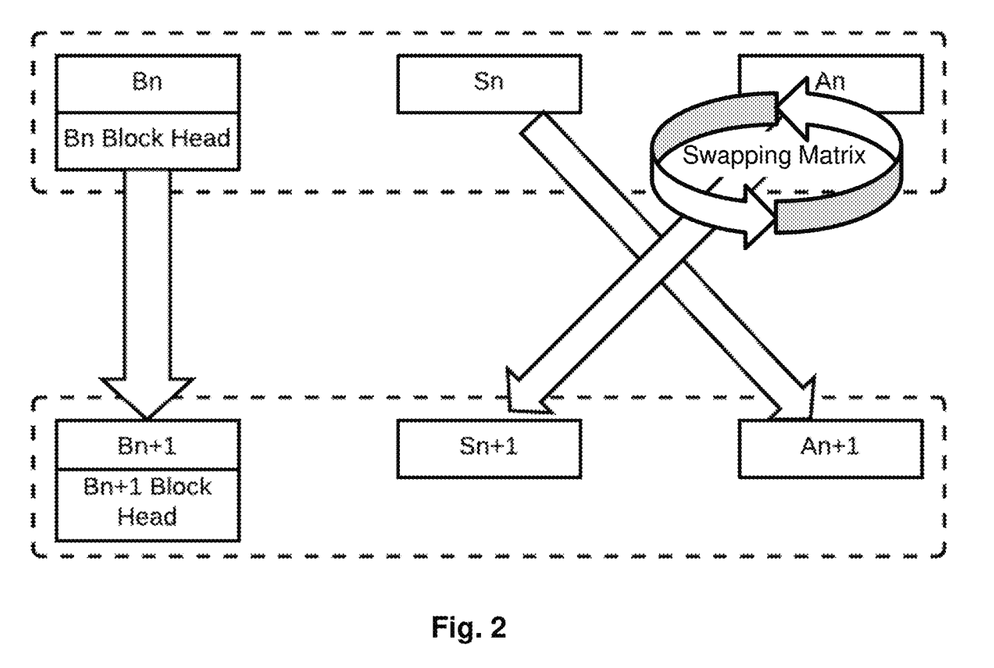
FIG. 2 is a pictorial representation illustrating generating full address in next block for address chain in accordance with an embodiment of the present invention.

FIG. 2 is a pictorial representation illustrating generating the full address in the next block for the address chain in accordance with an embodiment of the present invention. In particular, the full address in the next block for the address chain is generated by increasing one in the current block number (Bn) to be the next block number (Bn+1). The shard number (Sn) in the current block (Bn) becomes shard address (An) in the next block. Moreover, the current shard address (An) as input of the swapping matrix generates the shard number (Sn) in the next block. Further, the swapping matrix is composed of a current block head and current shard number (Sn). Subsequently, the shard number (Sn) and shard address (An) have the same number of digits.

Particularly, the address chain is a non-predictable and two-way traceable address chain of participating nodes.

In accordance with one embodiment of the present invention, the shard number (Sn+1) waits till the block head (Bn) is available, therefore the full address in block (Bn+1) is unknown until block head (Bn) is available.

In accordance with another embodiment of the present invention, the shard address (An) can be reversely generated as long as full address in (Bn+1) and (Bn) block head are available, thus, the addresses of the participating node are two-way traceable.

Figure 3:
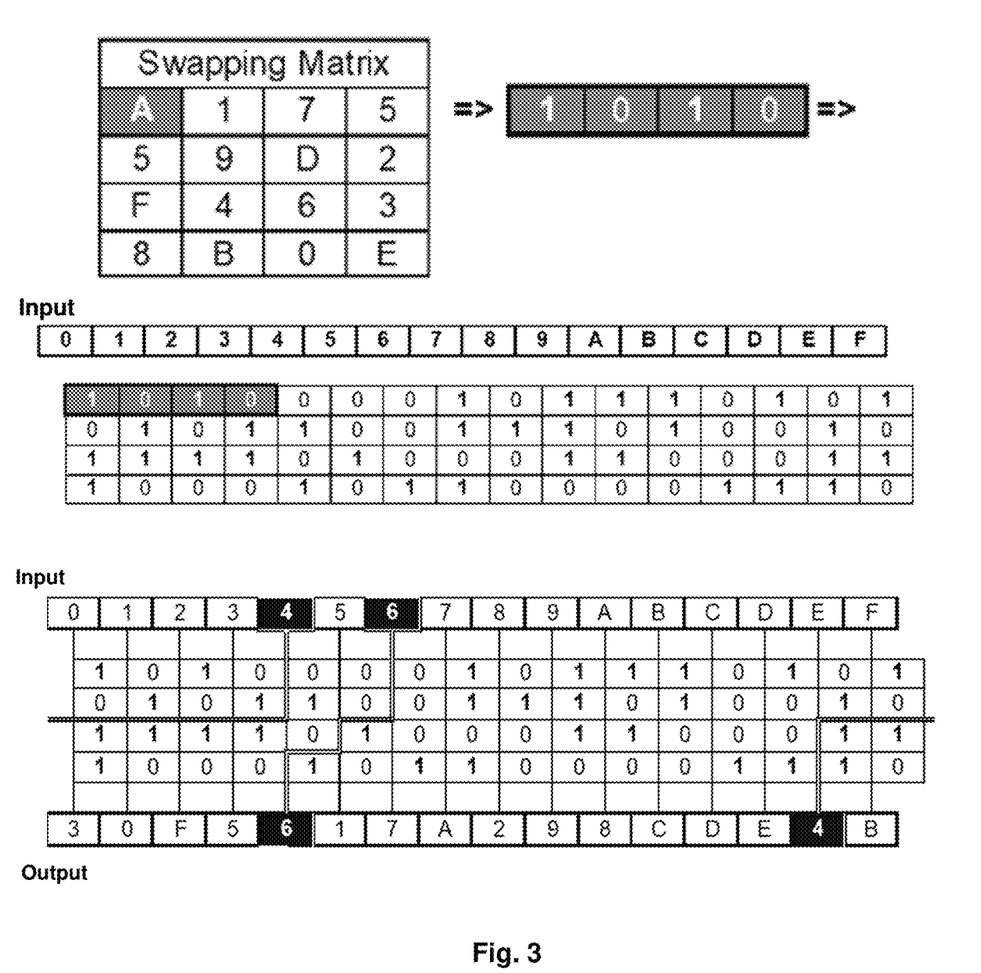
FIG. 3 illustrates an exemplary example of a swapping matrix for address assignment in accordance with an embodiment of the present invention.

FIG. 3 illustrates an exemplary ladder swapping example of a swapping matrix for address assignment in accordance with an embodiment of the present invention. In particular, the ladder lottery is based on group theory to ensure no clash to maintain uniqueness. Moreover, the cylinder swapping matrix connects the right most columns to the left most column. And, the swapping lines go across the cylinder by jumping over columns. Further, the digit 1 in matrix represents swapping lines and continuous 1 means swapping line "jumping over" columns. Subsequently, the downward line is cutting through continuous 1.

In the exemplary example of FIG. 3, the digit 6 follows the ladder lottery and maps downwards to digit 4. And, the digit 4 in the input address then swaps to digit 6 in the output address. Thus, for generation of swapped section
swapping Matrix: A175 59D2 F463 8BOE
Input Section: 4C82E
Output Section: 6D2F4
From 4=>6 C=>D 8=>2 2=>F E=>4

In accordance with one embodiment of the present invention, the address uniqueness is maintained under a block. The address includes a shard number (Sn) in section 1 and a Shard address (An) in section 2. In particular, each section 2 is unique under the same section 1 as the full address is unique. Moreover, the uniqueness of section 2 under the same section 1 is maintained after being swapped. Thereby, subsequently maintaining the address uniqueness.

Further, after swapping, the swapped addresses are grouped by new section 2 as shard number and section 1 becomes Shard address in the next block.

Figure 4:
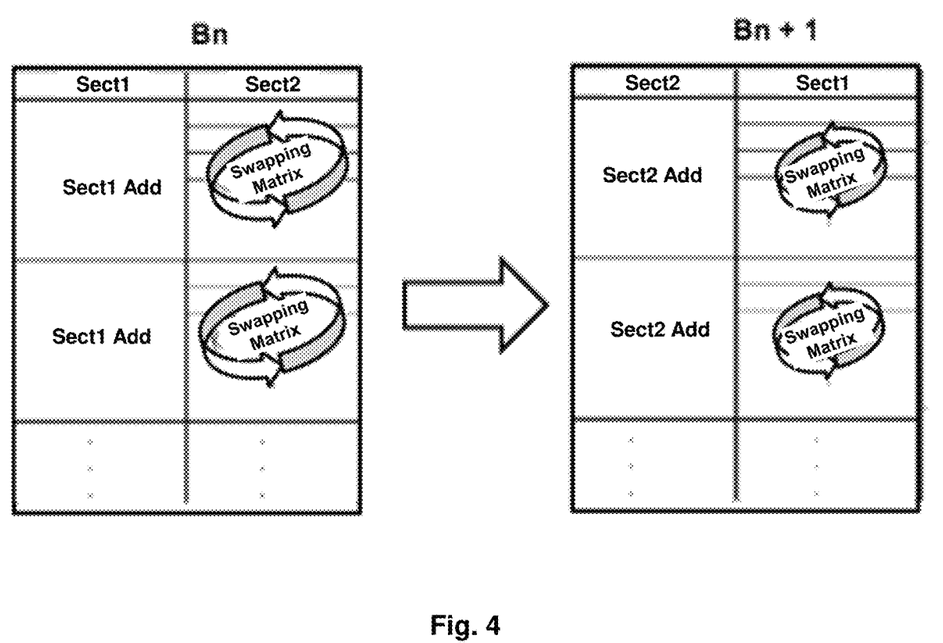
FIG. 4 illustrates a forward swapping and reverse swapping in accordance with an embodiment of the present invention.

FIG. 4 illustrates forward swapping and reverse swapping in accordance with an embodiment of the present invention. In particular, the forward swapping and reverse swapping provides a two-way traceability.

In accordance with an embodiment of the present invention, forward swapping under block Bn uses the swapping matrixes, that each shard has its unique matrix as shard number used in the matrix, to avoid same digits changed in the same way for the entire block (for example, all digit 7 changed to digit A). In particular, the full address in Bn includes shard number in section 1 and shard address in section 2. Moreover, section 2 of the same section 1 is swapped by a swapping Matrix formed by Bn block head and section 1, so that section 2 of different section 1 is swapped by a different swapping matrix.

Further, exchanging section 1 and section 2 to form a new address, the section 2 becomes the shard number for the next block Bn+1. Also, the nodes in the same shard in this block will not be in the same shard in the next block.

In accordance with an embodiment of the present invention, the reverse swapping under block (Bn+1) includes back exchanging of section 1 and section 2 to get the shard number in the previous block. In particular, the swapping Matrix when shard number and previous Bn block head are available. Moreover, by reverse mapping in the swapping matrix, the original section 2 is found.

Figure 5:
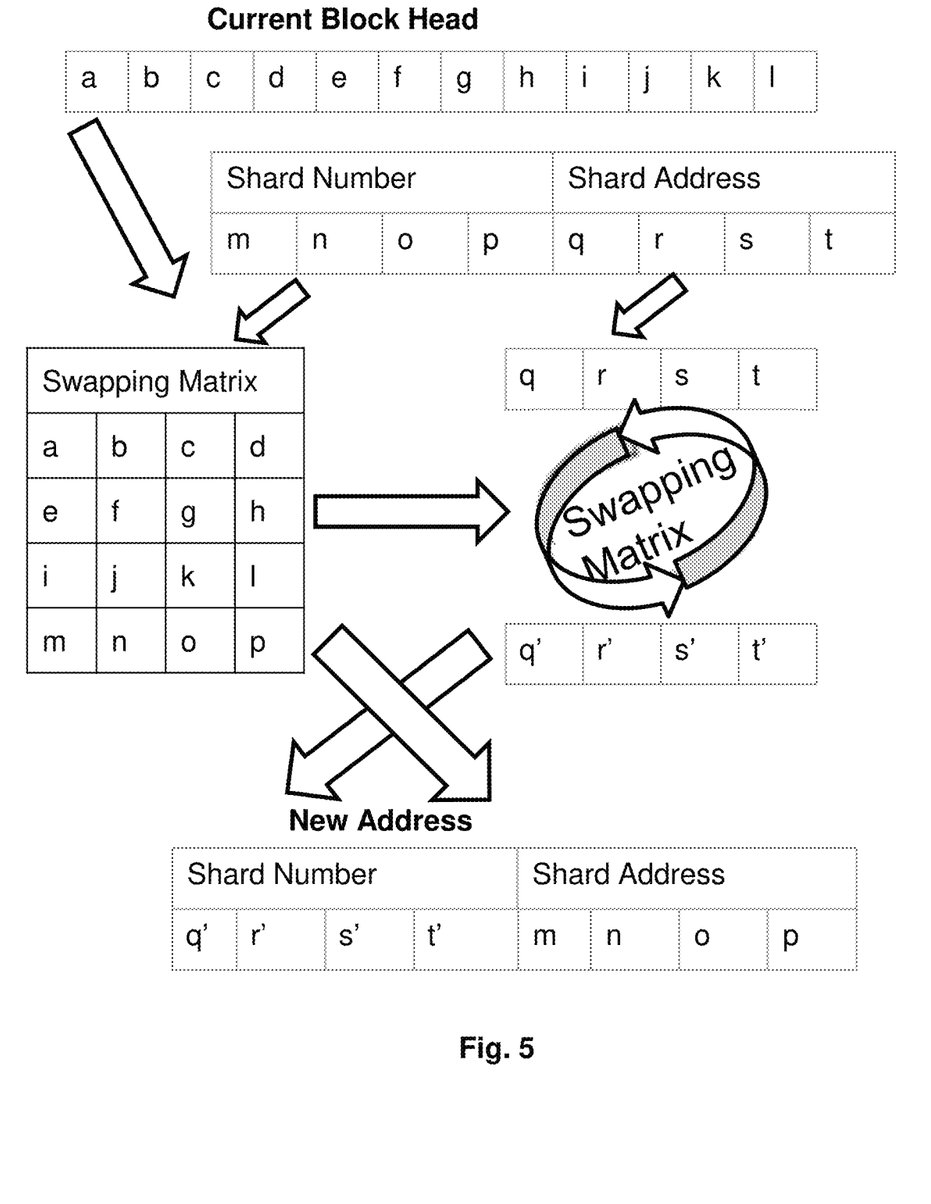
FIG. 5 illustrates a forward and a reverse processes of the address chain in accordance with an embodiment of the present invention.

FIG. 5 illustrates a forward and a reverse processes of the address chain in accordance with an embodiment of the present invention.

In accordance with one embodiment of the present invention, the forward process of address chain includes forming the swapping matrix with the Current block and the shard number, creating the shard number in the next block using the Shard address via swapping matrix and changing the Shard address in section 2 of the block via swapping. Particularly, the shard number of the current address is the Shard address in the next block.

In accordance with another embodiment of the present invention, the reverse process of the address chain includes swapping the current Shard address together with the previous block head to form the swapping matrix and generating a shard number by reverse mapping in the previous block. Particularly, the current shard number is the previous Shard address.

Figure 6:
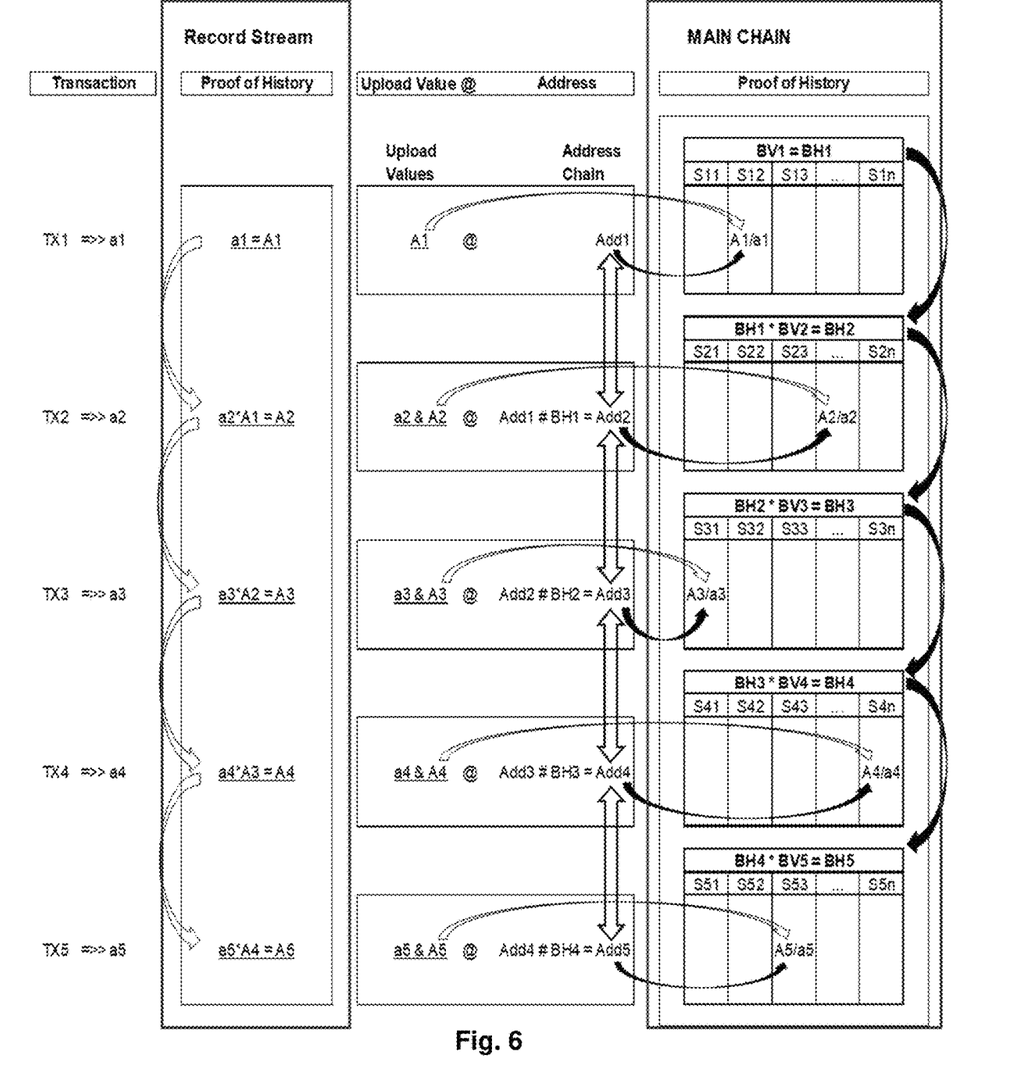
FIG. 6 illustrates a Crux chain platform operation of main chain and Record Stream in accordance with an embodiment of the present invention.

FIG. 6 illustrates a Crux chain platform operation of main chain and Record Stream in accordance with an embodiment of the present invention. In particular, the Crux chain platform includes a first block, a plurality of following blocks, a record stream and a proof of history for the record stream.

The first initial block includes a node assigned to an address of a shard and the first record value is a first stream value. For example, node A is assigned to address 1 of shard 12. Then the node A's first record value "a1" is stream value "A1" and uploads to address 1.

The plurality of following blocks includes a new address for each of the plurality of following blocks generated by a previous address and a previous block by a Ladder swapping protocol.

In an exemplary example, a new address for second block address 2 is generated by address 1 and block head 1 by Ladder swapping. And, node A's second record value "a2" is hashed with "A1" as stream value "A2". Further, both "a2" and "A2" are uploaded to address 2.

In accordance with an embodiment of the present invention, the user and/or participant may skip some blocks by using a blank record value to make the stream value for the upload.

The record stream includes a plurality of stream value. And, beside the first record each of the plurality of stream values is a current record value hashed with a previous stream value. The user and/or participant keeps all record values and stream values of all other participants in the same shard for validation.

The proof of history (PoH) for the record stream ensures each of the participating nodes owns its own unique record stream to upload its transaction records. Similarly, in the main chain of the Crux chain platform the record stream is composed by the proof of history (PoH).

In accordance with an embodiment of the present invention, the Crux chain platform also includes a blockchain server (not shown). In particular, the blockchain server performs steps of assigning a node a unique address with a shard number in section 1 and the shard address in section 2 in the block, linking a block by hashing function of a block value via parallel proof of history (PoH) to form a main chain, transforming the shard address by a swapping matrix as the shard number and linking user records by hashing of record value by parallel proof of history (PoH) to form record chain loaded in address chain and checking loaded records by parallel proof of history (PoH). In particular, the swapping matrix includes a current shard number and current block value, for a current shard address transformation to generate a shard number in a next block.

In accordance with an embodiment of the present invention, the blockchain server (not shown) further stores a plurality of modules (not shown). The plurality of modules include a parallel proof of history (PoH) module, a non predictable and traceable address chain module, an adjustment verification module, a bidding and mean/a preagreed percentile value module, a mathematical module and a cryptographic module.

The parallel proof of history (PoH) module is configured to link a user transaction record to form parallel proof of history (PoH) Record Streams with an address chain.

The non predictable and traceable address chain module is configured to generate a non predictable and a traceable address by a current address in a block and a current block value by the ladder swapping.

The adjustment verification module is configured to view a transaction record of a requester module in the shard and verifies it by either shard level verification (SLV) or record level verification (RLV).

The bidding and mean/a preagreed percentile value module operably allows the shard level bidding winner to participate and compare a block level mean/a preagreed percentile value to know a final winner and the final winner gets the price and its block as a formal version.

The mathematical module is operably configured to perform a hashing function to form the block. The hashing function is any of a secure hash algorithm, the ladder swapping, a modular addition or a modular multiplication.

The cryptographic module is configured to generate a crypto coin for rewarding the winner and collects revenue by charging a shard transaction fee. And, new coins may be generated as reward to winners in level two, or level one if necessary.

Figure 7:
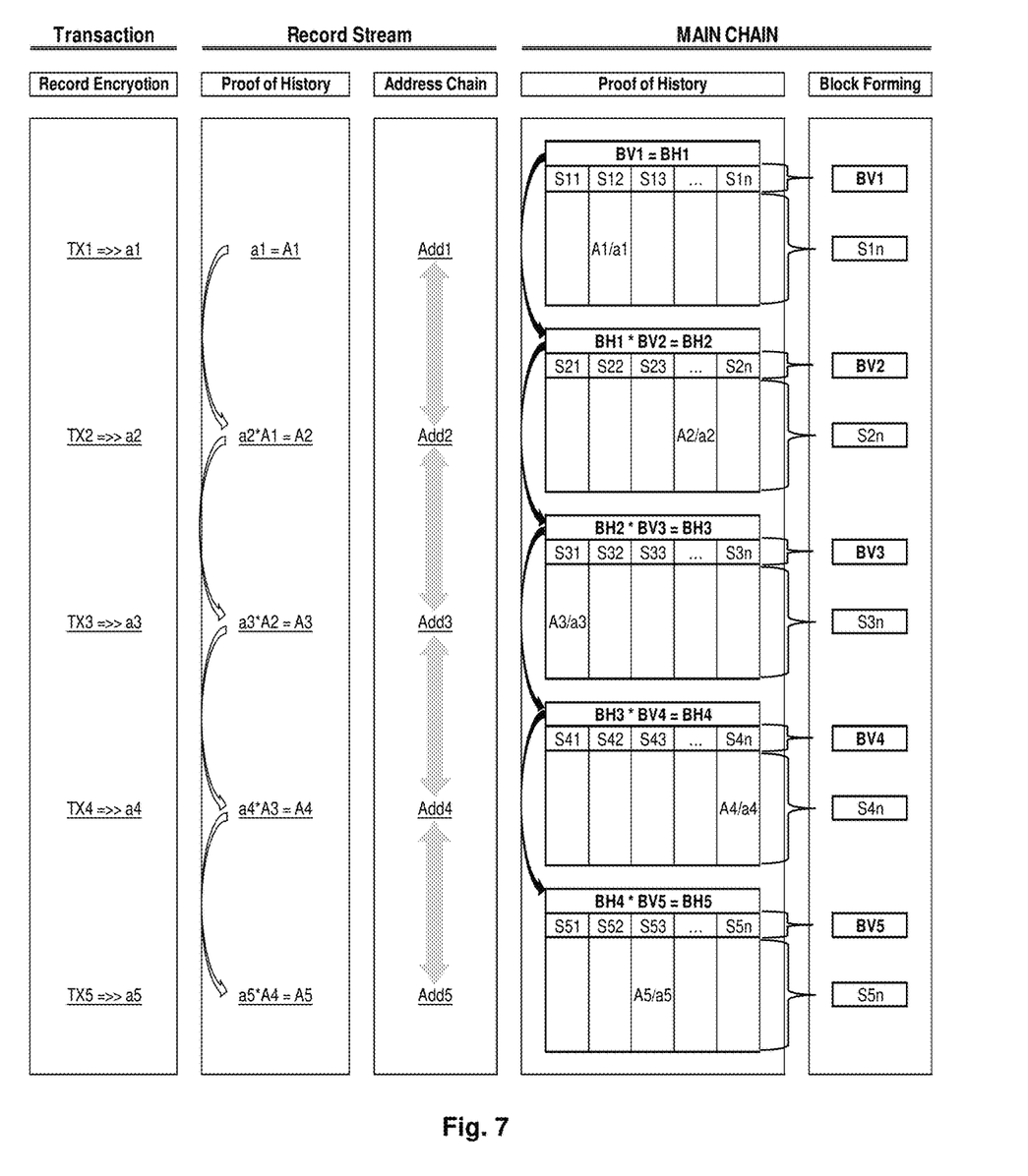
FIG. 7 illustrates a hashing function of the Crux chain platform in accordance with an embodiment of the present invention.

FIG. 7 illustrates a hashing function of the Crux chain platform in accordance with an embodiment of the present invention. In particular, five areas reviewed for the hashing algorithms includes but may not be limited to transaction record encryption, proof of history of participating node's record stream, address chain for record stream, proof of history of blocks and fabrication of shards and blocks from upload data.

Table below illustrates analysis of the various hashing function and desired properties for the Crux chain platform:

TABLE 1

Hashing function and Desired Properties

| Desired Property Hash function | Security Level | Non Predictable, traceable Two-way | Associativity and Commutativity | Area of Application |
|---|---|---|---|---|
| Secure hash algorithm | High | Non Predictable, One-way traceable | No | Transaction Record Encryption Proof of History of Participating Node's Record Stream Proof of History of Blocks |
| Ladder Swapping | Medium | Non Predictable, Two-way traceable | Associativity only | Address Chain for Record Stream |
| Modular Arithmetic | Low | Predictable and traceable | Associativity and Commutativity | Fabrication of shards and blocks from upload data |

After review of the security requirement and properties of secure hashing algorithm (SHA) and desired properties, following two functions are identified for other types of hashing:

Address chain when the ladder swapping fulfills the requirement of not predictable but two-way traceable. Parycilraly, the address chain may be used for record stream.

And fabrication of shards and blocks includes modular arithmetic, such as modular addition or multiplication, which can fulfil the required properties of associativity and commutativity. In particular, the fabrication of shards and blocks is from the upload data.

Further, as long as record encryption and proof of history (PoH) are still using a secure hashing algorithm (SHA), the overall security level is not affected and the performance will be improved substantially.

Figure 8:
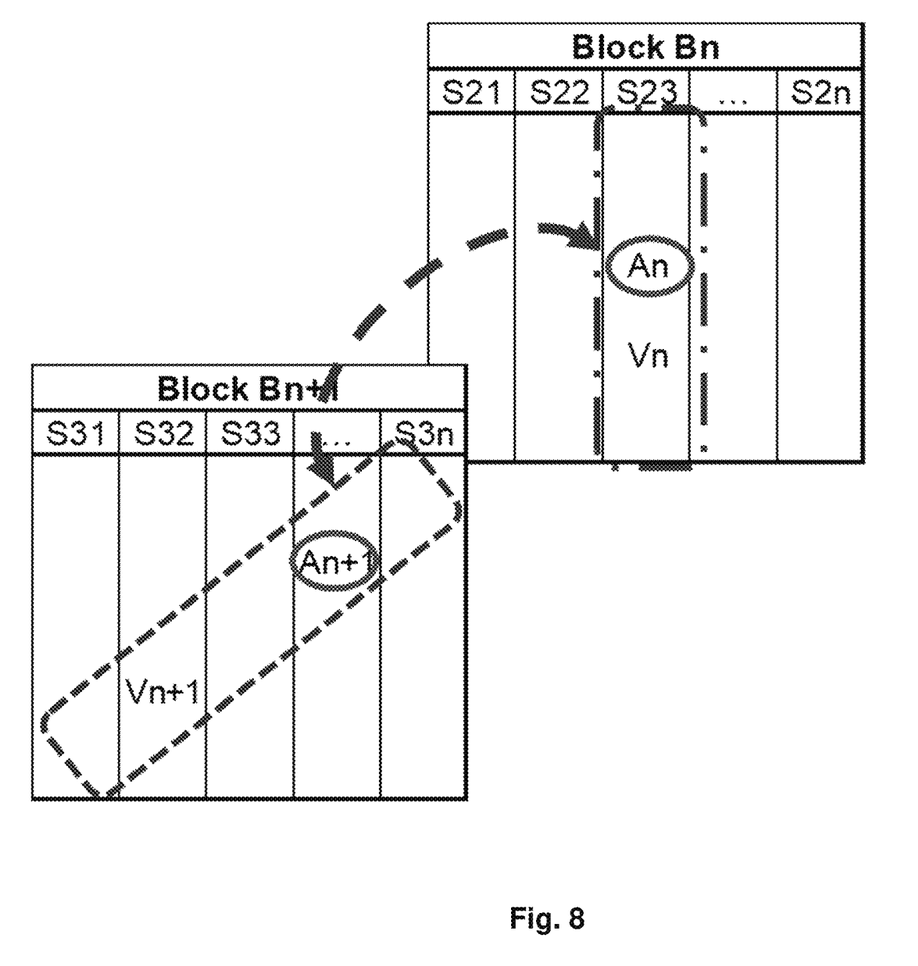
FIG. 8 illustrates an exemplary example of checking row in accordance with an embodiment of the present invention.

FIG. 8 illustrates an exemplary example of a checking row in accordance with an embodiment of the present invention. In the example, the participating Node A in block Bn is "An", and in block Bn+1 is "An+1". Other members in the same shard under the block Bn become a checking row member of "An+1" in the block Bn+1. Thus, the checking row members of "An+1" are under different shards in the block Bn+1 and cover all shards.

Particularly, the shard address in block Bn becomes the shard number in block Bn+1, which means nodes in the same shard in block Bn may not be in different shards in block Bn+1. The shard address in block Bn+1 obtained by shard number in block Bn and block head of the block Bn. Further, when there are no or few empty nodes, each participating node has previous block stream values of one member in another shard, beside record values and stream values of members in the same shard.

The verification of the record of a requester module in the shard is verified by anyone of a shard level verification (SLV) or a record level verification (RLV).

In accordance with an embodiment of the present invention, in the shard level verification (SLV) the requester module provides a full set of a record (record value and stream value) of the shard, the verifier module checks if the shard value of requested set matches a record. Further, the verifier module checks the record in the checking row, and applies a previous stream value with the record value.

In an exemplary example, the verifier module checks the record "Vn+1" in its checking row, and applies the previous stream value of "Vn" with the record value and stream value of "Vn+1".

Further, the shard level verification (SLV) verifies anyone of the checking row or the binary table.

In accordance with an embodiment of the present invention, in the record level verification (RLV) the requester module provides the record (record value and stream value) with a full address of the record and the verifier module checks if the record is in the shard, or in the checking row, and also checks with a previous stream value of the record. Otherwise, the verifier module forwards a request to the node in the same shard and the checking row for verification.

Figure 9:
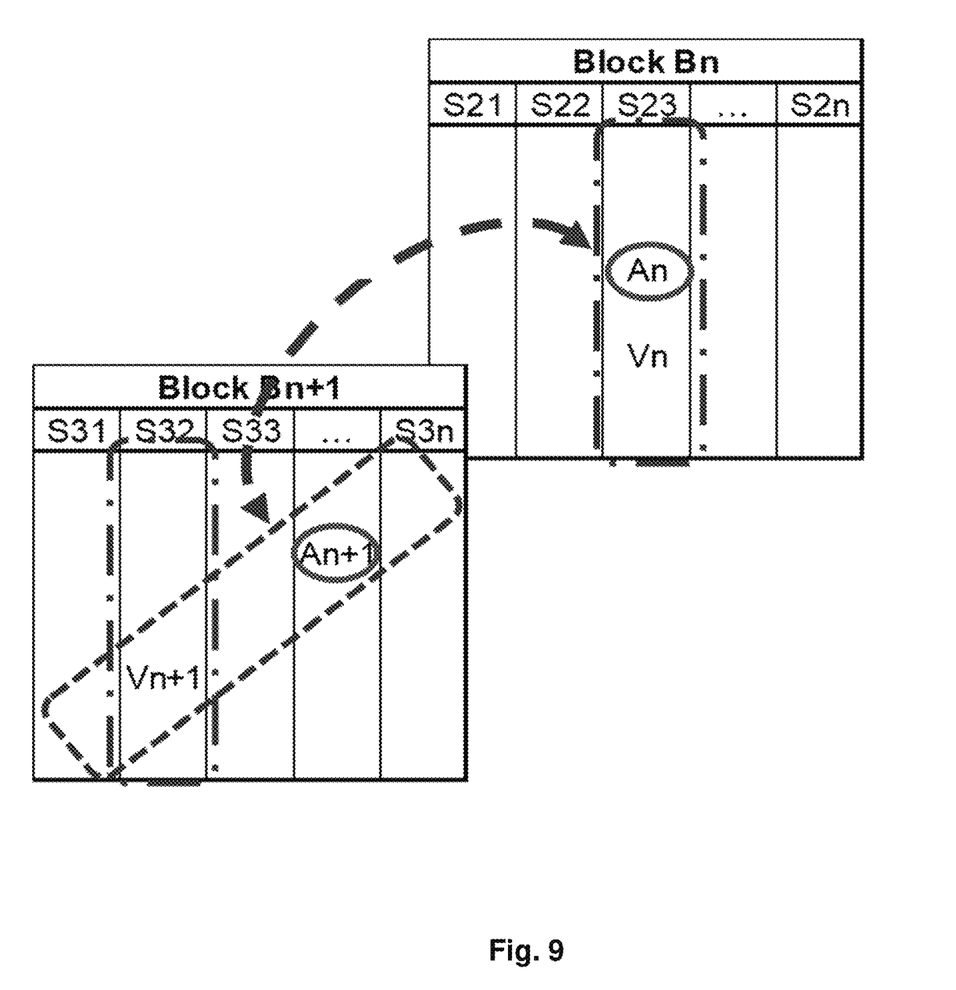
FIG. 9 illustrates a minimal data requirement for verification with the checking row in accordance with an embodiment of the present invention.

FIG. 9 illustrates a minimal data requirement for verification with the checking row in accordance with an embodiment of the present invention. Particularly, the checking row used in verifications has a minimal data requirement for verification. At block level, the minimal data requirement for verification of the participating nodes is block head and shard value to generate block value.

At shard level, stream values and record values in the same shard is the minimum data requirement for verification of the participating nodes.

In accordance with an embodiment of the present invention, the minimal data requirement for verification request includes stream values and record values of the shard where the requesting record belongs for shard level verification (SLV). And, the minimal data requirement for verification request includes record value and stream value, and the full address when the requesting record belongs to the record level verification (RLV).

Table 2 below illustrates the logic of a binary table in accordance with an embodiment of the present invention. The checking processes speeds up with modular hashing with associativity and commutativity by allowing hashing in any order, which also speeds up the process of forming blocks.

TABLE 2

Logic of a Binary Table

| Address | | | | Node Value | Checking Values | | | | | | | |
|---|---|---|---|---|---|---|---|---|---|---|---|---|
| | | | | | by 1 | | | | by 0 | | | |
| | | | | | P4 | P3 | P2 | P1 | N4 | N3 | N2 | N1 |
| 0 | 0 | 0 | 0 | a0 | — | — | — | — | a0 | a0 | a0 | a0 |
| 0 | 0 | 0 | 1 | a1 | — | — | — | a1 | a1 | a1 | a1 | — |
| 0 | 0 | 1 | 0 | a2 | — | — | a2 | — | a2 | a2 | — | a2 |
| 0 | 0 | 1 | 1 | a3 | — | — | a3 | a3 | a3 | a3 | — | — |
| 0 | 1 | 0 | 0 | a4 | — | a4 | — | — | a4 | — | a4 | a4 |
| 0 | 1 | 0 | 1 | a5 | — | a5 | — | a5 | a5 | — | a5 | — |
| 0 | 1 | 1 | 0 | a6 | — | a6 | a6 | — | a6 | — | — | a6 |
| 0 | 1 | 1 | 1 | a7 | — | a7 | a7 | a7 | a7 | — | — | — |
| 1 | 0 | 0 | 0 | a8 | a8 | — | — | — | — | a8 | a8 | a8 |
| 1 | 0 | 0 | 1 | a9 | a9 | — | — | a9 | — | a9 | a9 | — |
| 1 | 0 | 1 | 0 | a10 | a10 | — | a10 | — | — | a10 | — | a10 |
| 1 | 0 | 1 | 1 | a11 | a11 | — | a11 | a11 | — | a11 | — | — |
| 1 | 1 | 0 | 0 | a12 | a12 | a12 | — | — | — | — | a12 | a12 |
| 1 | 1 | 0 | 1 | a13 | a13 | a13 | — | a13 | — | — | a13 | — |
| 1 | 1 | 1 | 0 | a14 | a14 | a14 | a14 | — | — | — | — | a14 |
| 1 | 1 | 1 | 1 | a15 | a15 | a15 | a15 | a15 | — | — | — | — |

In particular, P row keeps modular hashing of records by corresponding digit in addresses being 1's, while N Row with records by corresponding digit in address being 0's. The content area illustrates the corresponding hashing relation of address binary digits for checking values. In operation, only node values, P1 to P4 and N1 to N4 are necessary. Further, the identical P rows and N Row are guaranteeing identical blocks and the required memory space is 2*log of total node number, compared with Merkle Tree which is total number of nodes.

Then, the values in the binary table are P1 to P4 and N1 to N4. For example, P3=mod(a4, a5, a6, a7, a12, a13, a14, a15), where, mod ( ) is the mathematical modular with properties of associativity and commutativity.

In particular, a binary table can be used for Value Checking. For example, if a6 is not identical, P3 & P2 and N4 & N1 will not be identical. By P3 & P2, addresses of non-identical nodes may be a6 or (a6 & a4) or (a6 & a2) or (a2 & a4) or (a2 & a4 & a6). And, by N4 & N1, addresses of non-identical nodes may be a6 or (a6 & a7) or (a6 & a14) or (a7 & a14) or (a6 & a7 & a14). Then, the only intersection concluded is a6.

Figure 10:
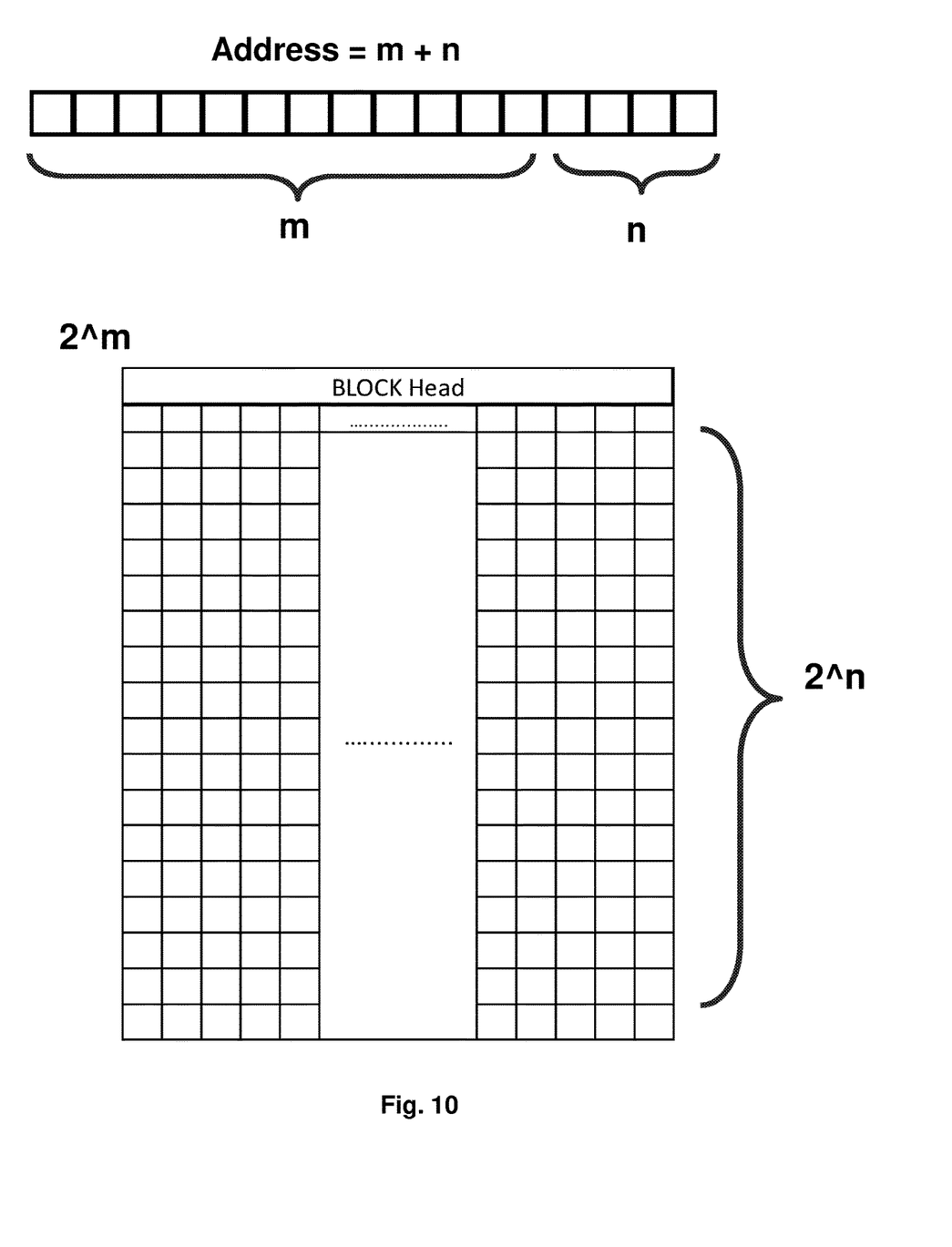
FIG. 10 illustrates a minimal data requirement for verification with binary table in accordance with an embodiment of the present invention.

FIG. 10 illustrates a minimal data requirement for verification with binary table in accordance with an embodiment of the present invention. In particular, the binary table used in verification reduces the memory requirement. The minimal data requirement for participating nodes include block head and shard values and binary tables of all shards. Also, stream values and record values of the same shard.

The minimal data requirement for verification request includes stream values and record values of the shard where the requesting record belongs for shard level verification (SLV). And, the minimal data requirement for verification request includes record value and stream value, and the full address when the requesting record belongs to the record level verification (RLV).

In particular, the verification with binary table is in two levels as illustrated in FIG. 10. The verification includes shard level verification (SLV) and record level verification (RLV).

At shard level verification (SLV), the requester module provides a full set of record values and stream values of the shard including requested record for the verifier module to check the consistency with the binary table of the shard.

At record level verification (RLV), the requester module provides a record (record value and stream value) with the full address of the record. The verifier module provides checking directly if in its shard, then checks with the record's previous stream value. Otherwise, the verifier module forwards the request to nodes in the same shard and/or checking row for verification.

Figure 11:
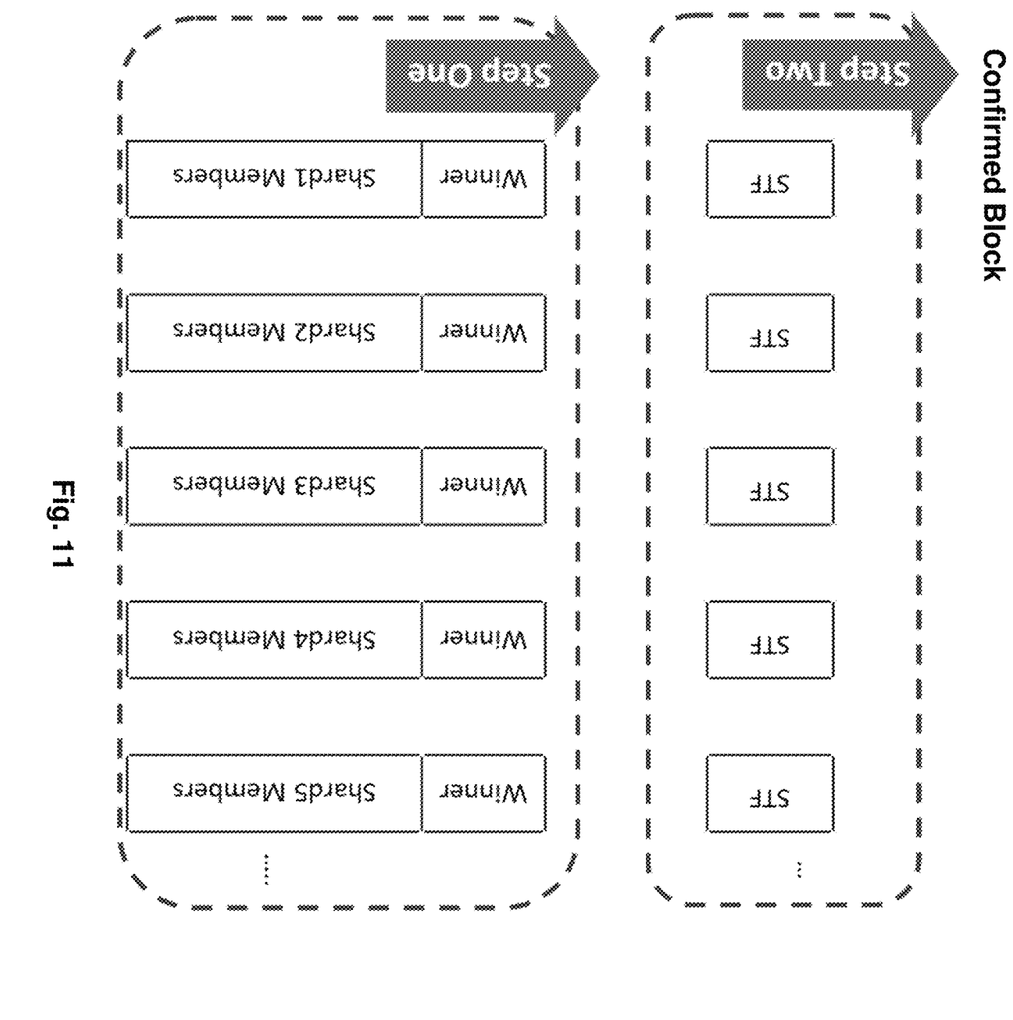
FIG. 11 illustrates an incentive of bidding and a mean/a preagreed percentile mechanism in accordance with an embodiment of the present invention.

FIG. 11 illustrates an incentive of bidding and a mean/a preagreed percentile mechanism in accordance with an embodiment of the present invention. The bidding and Mean/A preagreed percentile Value allows a shard level bidding winner to participate and compare a block level Mean/A preagreed percentile Value to know a final winner and the final winner gets the price and its block as a formal version. Thus, maintaining the incentive for participating nodes to gain reasonable profit and avoid huge waste of energy.

This is done in two steps. At step one, shard level bidding allows the participants to bid on rebate amount for representative or share representative and the winner pays the rebate to all other participants in the shard. The shard representative attends Level-two contends with shard transaction fee (STF). In particular, shard transaction fee (STF) is the collected fees minus rebate amount in the shard.

At step two, block level competition mechanism endows the shard representative with shard transaction fee (STF) closest to mean or a preagreed percentile of all shard transaction fees (STFs) being the winner of total shard transaction fee (STF), and its version of block is the confirmed for broadcasting to all participating shards. To avoid intentional cluster of bidders, the winner can be the one closest to a preagreed percentile position.

If the shard representative fails to attend, the entire shard records are not blocked and it returns the collected shard transaction fee (STF) including the already paid rebates as its penalty.

In accordance with an embodiment of the present invention, the cryptocurrency created may be used to pay transaction fees. And, new coins may be generated as reward to winners in level two, or level one if necessary. Once the number of nodes grows to a certain level and total transaction fees after rebates are substantial, a part of the shard transaction fee can be retained by the shard representative as a bonus.

The two level Crux chain platform of the present invention provides advantages such as a low bootstrapping cost, an economical operation with high throughput, thus making it ideal for frequent information transferring such as Nano-payment platform, Supply chain management and Insurance/reinsurance information sharing etc. Also, bidding and mean/a preagreed percentile value mechanism replaces the electricity-waste mining activity. Further, the binary table as substitution of Merkel Tree enhances both operation speed and reduction of memory space.

While there are several important innovative features for higher economic value by reducing memory requirement and expediting incentive mechanisms, its unique addressing technique provides transaction records with traceable but not predictable address chain making it robust to deliberately faulty processes, such as double spending etc. In addition, the concept of time stamp linking consequential blocks is also applied to records streams, therefore making the Crux chain platform ideal for cross-chain transactions allowing other blockchains to join. Moreover, the use of hashing functions is also reviewed and adjusted, to utilize mathematical properties of associativity and commutativity to further expedite processing time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Although some features and examples herein have been described in language specific to structural features or methodological steps, it is to be understood that the subject matter herein is not necessarily limited to the specific features or steps described. Any process descriptions, elements or blocks in the flow diagrams described herein or depicted in the attached figures should be understood as potentially representing modules, segments, or portions of code that include one or more executable instructions for implementing specific logical functions or elements in the process. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item.

This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components is not limited to embodiments including exactly that number of those components, unless expressly specified. However, such a claim does describe both embodiments that include exactly the specified number of those components and embodiments that include at least the specified number of those components.

What is claimed is:

1. A two level crux chain platform with a parallel Proof of History (PoH) for increasing security, robustness, performance and/or verifiability of a blockchain comprising:
   a first initial block comprising a node assigned to an address of a shard; wherein a first record value is a first stream value;
   a plurality of following blocks comprising a new address for each of the plurality of following blocks generated using a previous address and a previous block head by a ladder swapping protocol;
   a record stream comprising a plurality of stream value and each of the plurality of stream value is a current record value hashed with a previous stream value; and a blockchain server for storing a plurality of modules; and the blockchain server is configured to perform:

assigning the node, a unique address with a shard number in section 1 and a shard address in section 2 in a block;

linking the block by a hashing function of a block value via the parallel proof of history (PoH) to form a main chain;

transforming the shard address by a swapping matrix to generate the shard number in next block;

linking a user transaction record by hashing of a record value by the parallel proof of history (PoH) to form a chain of loaded records in an address chain; and checking the chain of loaded records in the address chain by parallel proof of history (PoH);

wherein the two level crux chain platform is operably configured to allow one or more cross-chain transactions, wherein a forward process of the address chain includes: forming a swapping matrix with a current block and a shard number; creating the shard number in a next block using a shard address via the swapping matrix; and changing the shard address in section 2 of the current block via swapping; wherein a shard number of a current address is the shard address in the next block, wherein reverse process of the address chain includes: swapping a current shard address together with a previous block head to form a swapping matrix; and generating a shard number by a reverse mapping in a previous block; wherein current shard number is previous shard address.

2. The two level crux chain platform as claimed in claim 1, wherein the plurality of modules further comprises: a Parallel Proof of History (PoH) module stored in the blockchain server is configured to link the user transaction record to form a parallel proof of history (PoH) record streams with the address chain using a secure hash technique;

a Non Predictable and Traceable Address Chain module stored in the blockchain server is configured to generate a non predictable and a traceable address by a current address in the block and a current block value by the ladder swapping protocol;

an adjustment verification module stored in the blockchain server is configured to view the user transaction record of a requester module in a shard and verifying by any of a shard level verification (SLV) or a record level verification (RLV);

a bidding/a preagreed percentile value module stored in the blockchain server operably allows a shard level bidding winner to participate and compare a block level/a preagreed percentile value to know a final winner, shard transaction fee (STF) is the total collected fees minus total rebate amount;

a mathematical module stored in the blockchain server operably configured to perform the hashing function to form a block and the hashing function is any of a secure hash algorithm, the ladder swapping protocol, a modular addition or a modular multiplication, wherein the mathematical module being configured to validate hashing of the transaction value according to the digits of an address; and a cryptographic module stored in the blockchain server operably configured with the bidding/a preagreed percentile value module and generate a crypto coins for rewarding the final winner and collecting a shard transaction fee.

3. The two level crux chain platform as claimed in claim 1, wherein two level crux chain platform further comprises: a checking row or a binary table for a shard level verification (SLV), wherein a shard record in current block is the checking row in the next block; and a binary table operably configured with a mathematical module stored in a blockchain server to validate hashing of a transaction value according to digits of the address.

4. The two level crux chain platform as claimed in claim 2, wherein a minimal data requirement for a verification request in shard level verification (SLV) includes a requesting record with a stream value and a record value of the shard.

5. The two level crux chain platform as claimed in claim 2, wherein a minimal data requirement for verification request in the record level verification (RLV) includes a requesting record with a record value, a stream value and a full address.

6. The two level crux chain platform as claimed in claim 1, wherein a minimal requirement for a node at a block level to generate the block value is a block head and a shard value.

7. The two level crux chain platform as claimed in claim 1, wherein a minimal requirement for the node at a shard level is a stream value and a record value in a same shard.

8. The two level crux chain platform as claimed in claim 1, wherein the swapping matrix performs a forward swapping or a reverse swapping.

9. The two level crux chain platform as claimed in claim 1, wherein the address chain performs any of a forward process and/or a reverse process.

10. The two level crux chain platform as claimed in claim 1, wherein the two level Crux chain platform is a multi level Crux chain platform.

\* \* \* \* \*